METHOD AND APPARATUS FOR FILLING VEHICLE GAS BAGS

Original Filed Oct. 19, 1970 2 Sheets-Sheet 1

METHOD AND APPARATUS FOR FILLING VEHICLE GAS BAGS

Original Filed Oct. 19, 1970 2 Sheets-Sheet 2

United States Patent Office

Re. 28,164
Reissued Sept. 17, 1974

28,164

METHOD AND APPARATUS FOR FILLING VEHICLE GAS BAGS

Robert L. Stephenson, Sterling Heights, Mich., assignor to Allied Chemical Corporation, New York, N.Y.

Original No. 3,674,059, dated July 4, 1972, Ser. No. 81,947, Oct. 19, 1970. Application for reissue Mar. 16, 1973, Ser. No. 342,127
Int. Cl. B65b *3/16*
U.S. Cl. 141—4 14 Claims

Matter enclosed in heavy brackets [ ] appears in the original patent but forms no part of this reissue specification; matter printed in italics indicates the additions made by reissue.

ABSTRACT OF THE DISCLOSURE

A method and apparatus for filling motor vehicle gas bags. A gas-filled cylinder is provided with an inlet pressure sensitive rupture disc and a dislodgeable outlet plug. The inlet disc is in communication with a combustible material. The material is fired, yielding a gaseous product. The outlet plug is dislodged before, concurrently or subsequent to the rupture of the inlet disc. The liberated gas flows to a diffuser, about which a motor vehicle gas bag is disposed, whereby the gas bag is filled.

METHOD AND APPARATUS FOR FILLING VEHICLE GAS BAGS

Background of the Disclosure

The instant invention is directed to a method and apparatus for filling an automobile gas bag. More specifically, the instant invention is directed to a method and apparatus for filling a gas bag employing both pressurized gas and pyrotechnic means. Most specifically, the instant invention is directed to a method and apparatus for filling an automobile gas bag by means of a combined stream of bottled gas and combustion product gas, said combustion gas providing the necessary pressure for the inflation of the gas bag for the necessary duration during impact.

It has been proposed that inflatable gas bags be employed in motor vehicles and especially automobiles as a means for constraining passengers therein, to prevent serious injuries in the event that the vehicle is involved in an impact. The use of gas bags is suggested as an alternative to seat belts which are presently employed. Although seat belts provide excellent protection against serious injury in automobile impacts, they suffer from the disadvantage that they are often not used. Ample evidence of their non-use is provided by the ever increasing toll of fatalities and serious injuries which occur each year on the nation's roads due to automobile and motor vehicle accidents.

In order to overcome the negligence of the automobile driving public it is proposed that a method be employed which would provide the protection of seat belts without requiring any voluntary act on the part of the motor vehicle driver or passenger. A method and apparatus which meets these requirements is motor vehicle or automobile gas bags. A vehicle gas bag is actuated upon impact automatically. The vehicle gas bag is instantaneously filled upon impact, constraining the automobile occupants in their seats during the critical moments following impact.

When this method of protection was first suggested, the means suggested for filling the gas bags was the commonly employed method of filling inflatable devices. That is, the use of a cylinder of pressurized gas. Up to this time, this has been the method employed for gas bag inflation. Although this method works, it is subject to certain disadvantages when employed in automobiles and motor vehicles.

An important disadvantage of a gas cylinder means for filling gas bags lies in the considerable weight and volume of a typical gas cylinder required to inflate a gas bag. It is well known in the automobile art that increased weight significantly increases the capital and operating costs of the automobile. It should be appreciated that the considerable pressure required by these cylinders requires thick walls. A thick walled cylinder is quite heavy. Moreover, the considerable volume of gas required necessitates the use of a relatively large volume cylinder. The logical place for disposal of this cylinder is under the hood in the engine compartment of the automobile. At present, the engine compartment of the typical automobile is fairly well cluttered. Thus, space is at a premium. The employment of a large volume cylinder seriously increases an already serious problem.

The second disadvantage of the proposed cylinder type of filling apparatus is related to safety. The pressure required in a method and apparatus in which a gas cylinder is employed for filling a gas bag is high enough to create a serious explosion danger. A high pressure gas cylinder, in the event of a malfunction, can act as a bomb.

What is required then, is an automobile gas filling apparatus and method which overcomes the disadvantages of the methods and apparatus currently proposed.

SUMMARY OF THE INVENTION

The method and apparatus of the instant invention is directed to filling a gas bag disposed in a moving vehicle, which provides the advantages of employing gas bags, instead of belts, without the disadvantages described above. Thus, the gas filling method and apparatus of the instant invention employs a smaller gas cylinder, maintained at much lower pressure, than those of the prior art. Because the gas cylinder of the instant invention is much smaller, its weight and volume are decreased compared to the designs proposed in the prior art methods of gas bag filling. Moreover, because of the lower pressure maintained in the gas cylinder of the instant invention the dangers of explosion are correspondingly decreased.

In order to compensate for the decreased size of the gas cylinder of the instant invention means are provided for supplementing the mass and pressure of the bottle with a pyrotechnic device. The pyrotechnic device also provides the triggering mechanisum for initiating the filling procedure. When the vehicle equipped with the instant invention is involved in an impact the signal is sent to the pyrotechnic triggering mechanism which fires the pyrotechnic device resulting in the combustion of the combustible product contained therein. The combustion products of the reaction result in the generation of large amounts of gas. Since the gas is constrained in a very small volume, the pressure increase is such that a disc disposed between pyrotechnic device and the gas cylinder breaks causing the movement of the generated gas into the gas cylinder already filled with a second gas. This will cause an increase in pressure in the gas cylinder, if the cylinder is not simultaneously vented at another point, as venting of the cylinder commences before communication between the gases generated and the cylinder commence. Thereafter, the pressurized gas is directed to a diffuser about which a gas bag is disposed.

In accordance with the instant invention, an apparatus and method is provided for filling gas bags disposed in motor vehicles comprising a gas generating means disposed in an enclosed space in communication with a gas containing means, filled with a gas, situated downstream of the gas generating means. The gas generating means and the gas containing means are separated by a pressure sensitive barrier. An actuating means for generating the gas in the gas generating means is provided whereby the gas generated in the gas generating means is released, due to the rupture of the barrier between the gas generating and gas containing means. The gas from the gas generating means flows into the gas containing means resulting in an increase in the mass and pressure flowing to the diffuser, sufficient to fill a gas bag in communication with said gas containing means. Means are provided for breaking the sealed outlet of the gas containing means, prior to, simultaneous with, or subsequent to rupture of the barrier between the gas generating and gas containing means, whereby a stream comprising generated gas and the gas originally contained in the gas containing means is liberated for use in filling the gas bag.

BRIEF DESCRIPTION OF THE DRAWING

The instant invention may be better understood by reference to the accompanying drawings of which.

DETAILED DESCRIPTION

Figure 1:
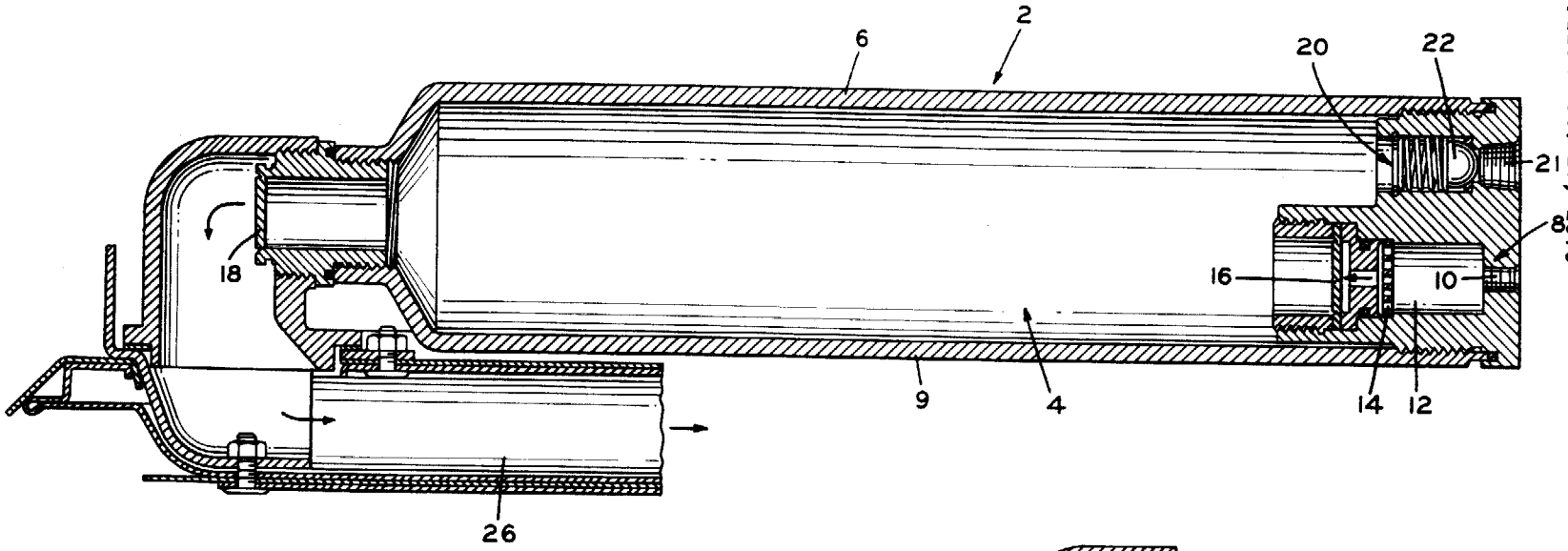
FIG. 1 is a sectional elevation view of the gas filling means of the instant invention.

Turning to FIG. 1 in detail, the overall gas filling means of the instant invention is generally indicated at 2. The gas filling means 2 comprises a gas containing means generally indicated at 4 and a gas generating means generally indicated at 8. Both compartments are enclosed in a pressurized tank 6. Typical of pressurized tanks, tank 6 is preferably in the shape of a cylinder.

The gas containing means 4 comprises everything within the tank 6 with the exception of the gas generating means 8. This includes a gas inlet means 20. The gas inlet means 20, in a preferred embodiment, comprises a tapped hole 21 which provides for communication with the source of compressed gas (not shown) and a ball check valve 22. The use of the check valve 22 is preferred in order to insure against any back flow of stored gas. In FIG. 1 the gas inlet means is shown disposed at the upstream end of the tank 6. It should be appreciated that this position of the inlet means 20 is optional and in other preferred embodiments the location of the inlet means 20 may be in other positions on the tank. The outlet of the gas containing means 4 comprises an outlet plug 18, which will be described in greater detail hereinafter. Because of the high pressures which are maintained within the gas containing means 4, the tank 6 is provided with a thick wall metal casing 9. The thickness of the wall 9 is designed so as to insure the structural integrity of the tank 6 if the wall is subjected to pressures in excess of those anticipated. The compressed gas contained within the tank is preferably air or nitrogen. Other gases of the type which are not toxic to humans and do not have a deleterious effect on the gas bags in which they are to be contained may be substituted for the preferred gases enumerated above.

The gas generating means 8 includes a squib 10. The squib 10 is in communication with an electrical impulse means (not shown) which supplies the spark to ignite the squib 10. The squib 10 is adjacent a source of combustible material, disposed in a combustible chamber 12. The chamber 12, a part of the generating means 8, comprises any combustible solid which generates relatively large volumes of gas upon combustion. In one preferred embodiment, black powder is employed as the combustible material in the chamber 12. Other materials which are easily burned and which generate large amounts of gas may be substituted for black powder. A diffuser 14 is disposed at the downstream end of the combustion chamber 12. The diffuser 14 provides uniform pressure and velocity of the combustion gas products which move downstream in the chamber 12. The gas generating means 8 also includes a rupture disc 16. The disc 16 separates the gas generating means 8 from the gas containing means 4. The disc 16 is designed to rupture at a specified pressure. As will be described below, this pressure is in the range of approximately 3,000 to 5,000 pounds per square inch. The disc 16 may be constructed of any suitable material which will satisfy the design parameters.

In addition to the gas containing means 4 and the gas generating means 8, the apparatus of the instant invention includes an outlet means 26. The outlet means 26 provides a conduit to move the exiting gases from the gas containing means 4 into a diffuser 27. The outlet means 26 configuration shown in FIG. 1 is illustrative and in no way limits the design of these means 26. In all cases, the means 26 directs the gases from the gas filling means 2 to a diffuser 27 over which at least one gas bag is disposed. In the preferred embodiment illustrated in FIG. 1, two gas bags 41 and 42 are provided. The bags, 41 and 42, are disposed over and in communication with diffuser 27.

The method of the instant invention for filling a gas bag comprises employing the gas generating means 8 to add gas to the gas containing means 4, to intermix the two gases, and thus heat and expand the gas in the gas containing means 4. In this way, the same effect is derived from a much smaller gas container means 4 than the large cylinder proposed in the prior art. A preferable gas generating means 8 is of the pyrotechnic type described above. A pyrotechnic device of the kind illustrated in FIG. 1 provides the twin advantages of an absolute minimum volume requirement with the additional advantage of the storage of high pressured gas potential at atmospheric pressure.

In one preferred embodiment, the gas generating means 8 is actuated upon an electrical signal transmitted through the squib 10. Thus, the gas generating means 8, in the form of a pyrotechnic device, provides an additional advantage over the prior are method of filling gas bags. That is, in the pyrotechnic method of the instant invention the gas generating means 8 provides an excellent actuating means. The electrical signal is generated upon impact of the vehicle in which the gas bag is disposed. Signal generation of this kind is well known in the art and any of the well known methods of electrical signal generation may be employed. The electrical signal ignites the squib 10. The squib 10, which comprises a rapid burning powder almost instantaneously ignites the combustible material in the combustion chamber 12. The combustible material in chamber 12 ignites, resulting in the rapid generation of high pressure, high temperature gas products. Due to the small volume of the chamber 12 pressures build up very rapidly. The gas exerts uniform pressure on the walls of the chamber 12. Three of the four walls are designed to withstand higher pressures than that generated by the gaseous product of the reaction in the chamber 12. However, the fourth wall is provided with the rupture disc 16 which is designed to withstand pressures not in excess of about 3,000 to 5,000 p.s.i. Pressures in excess of this amount result in the rupturing of the disc 16 with the resultant liberation of the constrained generated gases into the tank 6 of the gas containing means 4. In the preferred embodiment illustrated in FIG. 1, the disc 16 is in axial alignment with the axis of the horizonal tank 6. This disposition of the disc 16 in relation to the tank 6 provides the simplest and most efficient intermixing of the gases generated in the chamber 12 with the gas contained in the tank 6. Intermixing is optimized in that the mixing is more uniform and more rapid with this design than any other possible configuration. The diffuser 14 is disposed immediately upstream of the rupture disc 16 in order to prevent any non-uniformity of pressure on the disc 16. This prevents the unlikely occurrence of a pressure buildup on one section of the disc with the resultant rupture of the disc before the pressure in the chamber 12 attains the uniform design pressure.

The tank 6 of the gas containing means 4 is originally filled with an inert gas such as air, nitrogen or the like to a pressure in the range of about 1,000 to 3,000 pounds per square inch and preferably about 2,000 pounds per square inch. In order to accommodate this initial pressure the tank 6 has a volume in the range of about 50 to 150 cubic inches and preferably 100 cubic inches. The surge of hot gas from the gas generating means 8 almost immediately increases the pressure in the tank 6 to a pressure in the range of 3,000 to 5,000 p.s.i. and preferably 4,000 p.s.i. When the pressure in the tank 6 reaches the desired pressure, an outlet plug 18 is opened and the gas surges through the exiting means 26 to the diffuser 27.

It is of the utmost importance that the pressure of the gas exiting through the outlet means 26 be sufficiently high to insure proper inflation of the gas bags 41 and 42. Thus, it is very important that the outlet plug be removed when the pressure in the tank 6 has reached the desired pressure. One embodiment of the instant method for insuring proper inflation, in a preferred embodiment, is employment of the outlet plug 18 which operates in the same manner as the rupture disc 16. In this case, the plug 18 is designed to withstand pressures not in excess of that required to fill the gas bags 41 and 42. Therefore, if the pressure required to fill the bag is about 4,000 p.s.i., then the plug 18 will rupture or dislodge at 4,000 p.s.i.

Figure 2:
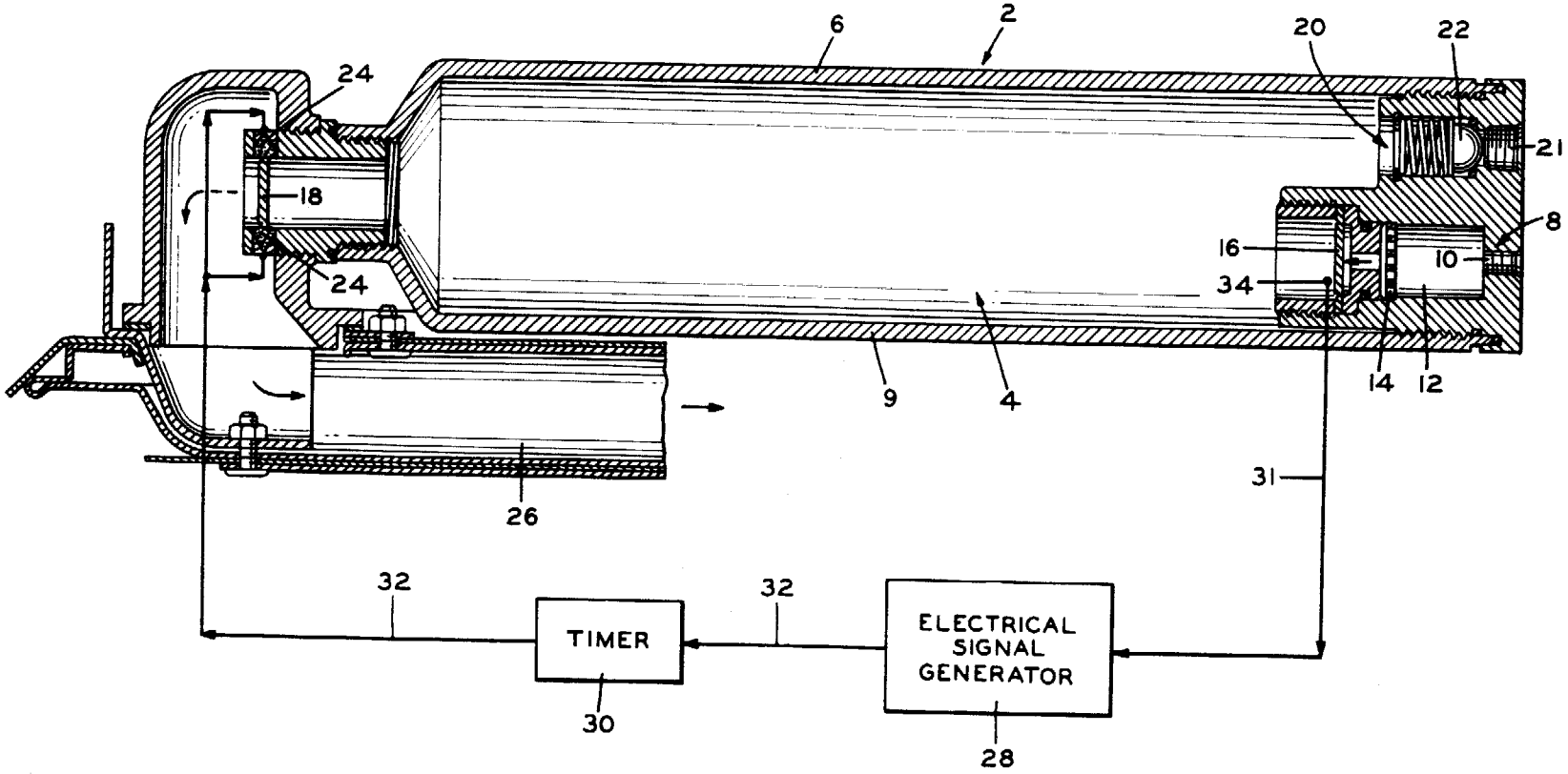
FIG. 2 is a sectional elevation view of the gas filling means of the instant invention illustrating an alternate embodiment.

A second embodiment of the instant method for plug 18 removal is illustrated in FIG. 2. The plurality of shape charges 24 are disposed around the periphery of the plug 18. Upon an electrical signal, the shape charges 24 explode releasing the plug 18 from the tank 6. The signal to initiate the explosive charges 24, in this case, is related to the initial signal igniting the squib 10. This second signal is transmitted at some time after the initial signal. FIG. 2 illustrates this second method. Upon rupture of the disc 16, a probe 34 is disturbed creating an electrical impulse transmitted by means of an electrical conduit 31 to an electrical signal generator 28. The generator 28 generates a signal conducted by a second electrical conduit 32. A timer 30, which may be employed, may hold up transmission of the electrical signal to the shape charges 24 for the required time so that plug dislodgement occurs some time after disc rupture. The time interval between disc rupture and signal generation is selected so that the pressure buildup in the tank 6 is sufficient for pressurization of the gas containing means 4 by the gas combustion product of the gas generating means 8. This necessary time interval may be calculated by experimental or analytical means.

This second embodiment illustrates an alternate embodiment of the instant method. In this embodiment, the signal to explode the shape charges 24 is related to the rupturing of the disc 16. As soon as the disc 16 begins to rupture, it transmits a signal which explodes the shape charges 24 so that the two explosions occur substantially simultaneously. This method is again illustrated by FIG. 2. Upon rupture of the disc 16, a signal is generated by the method enumerated above. However, in the instant embodiment the timer 30 is not included in the circuit. Therefore, the impulse created by the probe 34 is immediately transmitted as a signal to the shape charges 24 resulting in a simultaneous plug dislodgement and disc rupture. This provides the advantage of having only one single explosion during the gas filling operation. The buildup of pressure in the tank 6 in this embodiment is not quite as high as it is in the two stage disc rupture and plug removal sequence previously described, resulting in a noise abutment and the flow of cooler initial gas.

Figure 3:
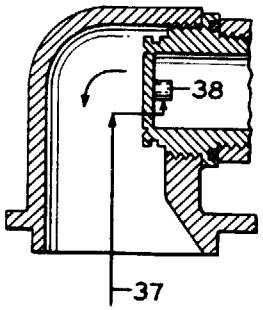
FIG. 3 illustrates one portion of the gas filling means of the instant invention, illustrating another alternate embodiment.

FIG. 3 illustrates still another preferred embodiment of the instant method. Instead of shape charges 24, a simple detonator 38 is disposed adjacent the outlet plug 18. The detonator is in communication with the igniting means (not shown), by means of electrical conduit 37, which is actuated upon impact. Thus, simultaneously a signal is transmitted to the squib 10 and the detonator 38. This results in the release of the gas contained in the gas containing means 4 prior to rupture of the rupture disc 16, since there is a time delay between ignition of the squib 10 and bursting of the disc 16. However, this period is sufficiently short so that there is mixing of the hot gas generated in gas generating means 8 with some of the gas originally contained in the gas containing means 4.

The embodiment illustrated in FIG. 3 may also be employed to provide the other preferred embodiments of the instant method. For instance, in the case of release of the gas containing means 4 after rupture of the disc 16, the electrical conduit 37 is in communication with a timer of type illustrated in FIG. 2. A signal is transmitted, to the squib 10, upon impact. The same signal is transmitted to the detonator 38 by means of the electrical conduit 37. However, the timer in the line 37 delays transmission of this signal to the detonator 38 for a time sufficient to allow pressure buildup and rupture of the disc 16.

Similarly this embodiment can be used to provide simultaneous release of gas from the gas containing means 4 and the gas generating means 8. In this case, a timer in the electrical line 37 delays transmission of the signal, initiated upon impact of the vehicle, and simultaneously transmitted to the squib 10, for a time period equal to the time required for pressure buildup in the gas generating means 8 so that rupture of the disc 16 occurs simultaneously with the explosion of the detonator 38.

It should be appreciated from the above, that in the method of the instant invention gas from the gas generating means 8 may flow into the gas containing means 4 prior to, simultaneously with, or subsequent to release of the outlet plug 18. Thus, gas in the gas containing means may flow into the diffuser 27 and the gas bags 41 and 42 at different temperatures and pressures. Of course, the gas stream flowing into the gas bags 41 and 42 will be at a higher temperature and pressure if the disc 16 of the gas generating means 8 is released prior to release of the gas containing means 4 due to the higher temperature of the gas generated and the fact that this additional mass of gas is constrained within the same fixed volume. The lowest temperature and pressure is attained when release of the gas containing means 4 occurs prior to release of the gas generated in gas generating means 8 into the gas containing means 4. Although optimum filling conditions require the highest possible pressure with the relative lowest possible temperature, all of the above sequences result in generation of gas whose pressure is great enough to inflate the gas bags 41 and 42 for a sufficient period of time to permit occupant constraint during the critical period during impact and whose temperature is sufficiently low so that overheating of the bags does not occur.

Another problem that arises in the inflation of vehicle gas bags is the noise accompanying bursting of the barrier between the outlet 26 and gas containing means 4 and barrier between the gas generating means 8 and the gas containing means 4. This noise level must be within acceptable limits. The minimum total noise level generated occurs in the case where release of the barrier between gas containing means 4 and the outlet 26 occurs prior to the release of the barrier between the gas generating means 8 and the gas containing means 4. The maximum noise level occurs when the sequence of release of the two barriers is reversed, that is, release of the gas generating means prior to release of the gas containing means. Of course, the apparatus of the instant invention is designed so that no matter which of the three sequences is selected, the noise level generated is within acceptable limits.

In this regard it should be appreciated that in the case where a simple detonator is employed to burst the outlet plug, the detonating device is (always) preferably disposed within the gas containing means to minimize the sound intensity accompanying gas bag inflation. This is illustrated in FIG. 3 wherein the detonator 38 is disposed adjacent the outlet plug 18 on the side of plug defining the downstream end of the gas containing means 4. Thus, the detonator is within the gas containing means.

It should be appreciated from the above that selection of the above-described sequence is a matter of evaluation of the design of the installation. The sequence selected in each installation will provide the optimum combination of maximum pressure and minimum temperature and noise level.

The pressurized gas existing through the outlet means 26, after removal of the plug 18, is directed to the diffuser 27 about which gas bags 41 and 42 are disposed. The gas bags 41 and 42 are inflated constraining the passenger or driver to the seat. It should be appreciated that several gas bags are required in a single motor vehicle. At [lease] *least* one gas bag (which may comprise a single bag or a bag within a bag) would be required for each occupant in the vehicle.

Direction of flow from the gas generating means through the gas container means, or reservoir, and out of the gas container means to the diffuser and bag is preferably substantially in a single direction. This single direction of flow provides for simplicity and efficiency, maximum mixing of generated gas and compressed gas, quick emptying of gas into the bag, and the reduction of cross current or eddy flow of gases, among other advantages.

Although the gas filling means of the instant invention may be designed to fill one bag, the preferred embodiment described relates to a filling means to fill a two bag system disposed about a diffuser. Those skilled in the art will appreciate that the outlet means 26 may be a manifold directed to several diffusers throughout the vehicle whereby the gas filling means of the instant invention may be employed to fill several bags. It is anticipated that a single gas filling means will be employed to fill one or two bags because a filling means which fills more than one or two bags would require more space than is probably available in any one location in the vehicle. However, this point is a matter of choice for the designer.

It should be appreciated that the above-described preferred embodiment of the method and apparatus of the instant invention is meant to be illustrative only. The foregoing specification and drawing will make apparent various modifications which are within the contemplation of the instant invention. Thus, the scope of the instant invention should be limited only by the appended claims.

What is claimed is:

1. A method for filling a gas bag, disposed in a vehicle, comprising the steps of:

a. filling a gas containing means with a compressed gas;

b. firing a combustible material, disposed in a closed chamber adjacent to said gas containing means, upon impact of said vehicle whereby combustion gases are generated in said chamber; and c. releasing said compressed gas to an outlet means, in communication with said gas bag, simultaneously with the release of said combustion gases into said gas containing means, whereby said gas bag is inflated.

2. A method for supplying gas to an air bag comprising the steps of generating gas, directing the generated gas into and through a reservoir [at least partially] containing compressed gas, *maintaining said compressed gas in said reservoir with barrier means,* flowing compressed gas and generated gas into said air bag, *removing said barrier means so as to* initially [flowing] *flow* said compressed gas into said air bag at a time in relation to the directing of the generated gas into the reservoir selected from a class consisting of (1) before said direction or, (2) substantially simultaneous with said direction or, (3) after said direction, and said direction of the generated gas into and through said reservoir and the flowing of the compressed gas and said generated gas from said reservoir being substantially in a single direction.

3. A method for filling a gas bag, disposed in a vehicle, comprising the steps of:

(a) filling a gas containing means with a compressed gas;

(b) releasing said compressed gas to an outlet means, in communication with said gas bag;

(c) firing a combustible material, disposed in a closed chamber adjacent to said gas containing means, upon impact of said vehicle whereby combustion gases are generated in said chamber; and (d) *after release of said compressed gas has commenced,* thereafter releasing said combustion gases into said gas containing means, whereby said gas bag is inflated.

4. An apparatus for filling at least one gas bag, disposed in a vehicle comprising:

a. an enclosed gas containing means, filled with a pressurized gas;

b. an enclosed gas generating means provided with a combustible material, disposed adjacent to said gas containing means;

c. an actuating means for igniting said combustible material whereby the product of the combustion reaction which results therefrom is high pressure combustion gas;

d. a pressure sensitive barrier means disposed between said gas generating means and said gas containing means, said barrier designed to rupture when the pressure in said gas generating means exceeds the maximum design pressure of said barrier means whereby said combustion gas flows into said gas containing means.

e. a means to release said gas in said gas containing means; and f. outlet means connected to and downstream of said gas containing means, in communication with said gas bag, whereby said released gas flows into and fills said gas bag, wherein said means to release said gas in said gas containing means comprises an outlet plug, provided with an explosive means, in electrical communication with said pressure sensitive barrier means whereby said explosive means are actuated by rupturing of said barrier means causing said plug to be dislodged simultaneously with the rupture of said barrier means.

5. An apparatus for filling at least one gas bag, disposed in a vehicle comprising:

a. an enclosed gas containing means, filled with a pressurized gas;

b. an enclosed gas generating means provided with a combustible material, disposed adjacent to said gas containing means;

c. an actuating means for igniting said combustible material whereby the product of the combustion reaction which results therefrom is high pressure combustion gas;

d. a pressure sensitive barrier means disposed between said gas generating means and said gas containing means, said barrier designed to rupture when the pressure in said gas generating means exceeds the maximum design pressure of said barrier means whereby said combustion gas flows into said gas containing means;

e. a means to release said gas in said gas containing means; and f. outlet means connected to and downstream of said gas containing means, in communication with said gas bag, whereby said released gas flows into and fills said gas bag, wherein said means to release said gas in said gas containing means comprises an outlet plug, provided with an explosive means, in electrical communication with said actuating means whereby ignition of said actuating means and said explosive means occurs simultaneously whereby dislodgement of said plug occurs prior to rupture of said pressure sensitive barrier means.

6. An apparatus in accordance with claim 5 wherein said explosive means comprises a detonator disposed adjacent to said outlet plug.

7. An apparatus in accordance with claim 5 wherein said explosive means comprises a plurality of shaped charges disposed within said gas generating means about said outlet plug.

8. An apparatus for filling at least one gas bag disposed in an automobile comprising:

(a) a [cylindrical tank] *receptacle*, provided with an inlet means, said [tank] *receptacle* containing a pressurized gas to fill said gas bag;

(b) an enclosed gas generating means, disposed within said [cylindrical tank] *receptacle*, and [filled with] *containing* a combustible material;

(c) an ignition means adjacent to said gas generating means, said ignition means actuated [by] *as a result of signal from a sensor on* impact of said automobile whereby said ignition means is ignited, resulting in a combustion reaction with the resultant formation of a high temperature gaseous combustion product;

(d) a rupture disc disposed in the downstream wall a said enclosed gas generating means, axially parallel with the center axis of said [cylindrical tank] *receptacle*, said disc designed to rupture when the pressure built by the generation of gas in said gas generating means reaches the desired combustion gas pressure whereby the combustion gas flows into said [cylindrical tank] *receptacle*;

(e) a frangible outlet plug disposed in the downstream end of said [cylinder] *receptacle; a detonator for removing the frangible plug, said detonator actuated on signal from said sensor;* and (f) an outlet means disposed downstream of said outlet plug and in communication with a diffuser, about which a gas bag is disposed, whereby said gas in said gas generating means is transported to said gas bag upon release of said outlet plug.

9. An apparatus in accordance with claim 8 whereby said inlet to said [cylindrical tank] *receptacle* comprises a ball check valve.

10. An apparatus in accordance with claim 8 wherein said [combustibel] *combustible* material comprises black powder.

11. An apparatus in accordance with claim 8 wherein said pressurized gas in said [cylindrical tank] *receptacle*, prior to the release of said gas in said gas generating means is at a pressure in the range of about 1,000 to 2,500 pounds per square inch.

12. An apparatus in accordance with claim 11 wherein said gas is at a pressure of about 2,000 pounds per square inch.

13. An apparatus in accordance with claim 8 wherein said rupture disc is designed to rupture at a pressure in the range of about 3,000 to 5,000 pounds per square inch.

*14. A method for supplying gas to an air bag comprising the steps of generating gas, directing the generated gas into and through a reservoir containing compressed gas, flowing compressed gas and generated gas into said air bag, initially flowing said compressed gas into said air bag at a time in relation to the directing of the generated gas into the reservoir selected from a class consisting of (1) before said direction, or (2) substantially simultaneous with said direction, and said direction of the generated gas into and through said reservoir and the flowing of the compressed gas and said generated gas from said reservoir being substantially in a single direction.*

References Cited

The following references, cited by the Examiner, are of record in the patented file of this patent or the original patent.

UNITED STATES PATENTS

| | | | |
|---|---|---|---|
| 2,779,281 | 1/1957 | Maurice et al. | 280—150 AB |
| 3,089,419 | 5/1963 | Doward | 280—150 AB |
| 3,122,181 | 2/1964 | Hebenstreit et al. | 23—281 |
| 3,336,045 | 8/1967 | Kobori | 280—150 AB |
| 3,558,285 | 1/1971 | Ciccone et al. | 23—281 |
| 3,655,217 | 4/1972 | Johnson | 280—150 AB |

HOUSTON S. BELL, JR., Primary Examiner

U.S. Cl. X.R.

23—281; 102—39; 141—67; 280—150AB